United States Patent [19]

Pompier

[11] Patent Number: 5,087,103
[45] Date of Patent: Feb. 11, 1992

[54] AUXILIARY WHEEL TO BE PAIRED TEMPORARILY WITH A VEHICLE WHEEL AND TRAVELING DEVICE THUS OBTAINED

[75] Inventor: Jean-Pierre Pompier, Volvic, France

[73] Assignee: Compagnie Generale Des Etablissementsmichelin - Michelin & Cie, Clermont-Ferrand, France

[21] Appl. No.: 527,368

[22] Filed: May 23, 1990

[30] Foreign Application Priority Data

May 1, 1989 [FR] France ............... 89 07495

[51] Int. Cl.⁵ ................... B60C 17/04; B60B 15/00
[52] U.S. Cl. ........................... 301/39 R; 301/40 S
[58] Field of Search ............... 301/38 R, 39 R, 39 T, 301/40 R, 40 S; 152/323

[56] References Cited

U.S. PATENT DOCUMENTS

| | | | |
|---|---|---|---|
| 1,886,977 | 11/1932 | Rodgers | 301/38 R X |
| 2,742,941 | 4/1956 | Johnson | 152/326 |
| 3,024,070 | 3/1962 | Lardin | 301/39 R |
| 3,770,323 | 11/1973 | Isaacson | 301/38 R |
| 4,832,098 | 5/1989 | Palinkas et al. | 152/323 X |

FOREIGN PATENT DOCUMENTS

| | | |
|---|---|---|
| 21822 | 11/1919 | France . |
| 1408477 | 9/1964 | France . |
| 960323 | 6/1964 | United Kingdom . |

OTHER PUBLICATIONS

Revue Automobile Suisse, vol. 82, No. 48, Nov. 27, 1987, p. 5, "Le retour du pneu plein?".

Primary Examiner—Russell D. Stormer
Attorney, Agent, or Firm—Oblon, Spivak, McClelland, Maier & Neustadt

[57] ABSTRACT

An auxiliary wheel is to be paired with a main wheel of a vehicle, while the main wheel remains on the vehicle. The auxiliary wheel includes a disk having a wheel rim, as well as a tire mounted on the wheel rim. In order to securely mount the auxiliary wheel on the main wheel, a bolt is insertable through a hole in the disk of the auxiliary wheel, the hole being eccentric with respect to the rotational center of the auxiliary wheel. An arcuate guide slot is formed in the auxiliary wheel disk, the guide slot forming an arc of a circle centered on the hole. A threaded rod fits into the slot and can be threaded into the main wheel, and tightened when the centers of the main and auxiliary wheels become concentric after mounting.

16 Claims, 5 Drawing Sheets 5,087,103

AUXILIARY WHEEL TO BE PAIRED TEMPORARILY WITH A VEHICLE WHEEL AND TRAVELING DEVICE THUS OBTAINED

BACKGROUND OF THE INVENTION

1. Filed of the Invention

This invention relates to automobile wheels. More particularly, it relates to the wheels to be used temporarily in case of damage to a pneumatic tire, or else in case of driving under difficult conditions, such as in mud or snow.

2. Background of the Invention

At present, when one of the pneumatic tires mounted on the wheels of a vehicle has suffered a puncture, it is necessary to remove the wheel concerned and replace it with a reserve wheel, commonly called a spare wheel. Another possibility known in the art consists of mounting a spare wheel beside the deflated pneumatic tire, without removing the latter. An illustration of this is found in patent GB 967 397. Hereinafter, such a spare wheel will be called an "auxiliary wheel," and the wheel normally mounted on the vehicle, with which the auxiliary wheel will be paired in case of damage to the pneumatic tire mounted on the main wheel, will be called a "main wheel."

These auxiliary wheels have not found practical application, although they are very appealing in theory since the installation operations are simplified relative to the replacement of one wheel by another.

The unresolved difficulty in the art consists in reconciling two contradictory requirements. It is necessary that the means of fastening the auxiliary wheel to the main wheel make possible an extremely simple handling for the driver, so that the use of such an auxiliary wheel will confer a major advancement relative to the standard use of a spare wheel. It also is necessary that the means of fastening be solid enough to hold the auxiliary wheel absolutely parallel to the main wheel, so that the use of such an auxiliary wheel can be made with a sufficient level of reliability.

Further, the weight and the overall dimensions of such an auxiliary wheel should compare favorably with those of a spare wheel, in particular with a temporary use type spare wheel as is found on some vehicles. It also is necessary that the mounting of the auxiliary wheel on the main wheel does not involve for the latter a substantial increase in weight, a large increase in cost or a deterioration of aesthetic appearance.

SUMMARY OF THE INVENTION

It is an object of the present invention to provide an auxiliary wheel fastenable to a main wheel so as to provide a spare traveling device.

It is a further object of the invention to provide an auxiliary wheel fastenable to a main wheel such that the auxiliary wheel is absolutely parallel to the main wheel.

It is a further object of the invention to provide an auxiliary wheel having a weight and overall dimensions which compare favorably with those of a spare wheel.

It is a further object of the invention to provide an auxiliary wheel which can be mounted on a main wheel without a substantial increase in the weight and the cost of the main wheel, or in a deterioration of the aesthetic appearance of the main wheel.

The above, and other, objects are achieved according to the present invention by an auxiliary wheel to be paired with a main wheel of a vehicle, in which the auxiliary wheel comprises a disk having a wheel rim, and a tire mounted on the wheel rim. Pivot means are formed on the disk at a position eccentric to the center of the tire for pivoting the auxiliary wheel relative to the main wheel. Guide means are formed on the disk and define an arc of a circle centered on the pivot means for guiding the pivoting of the auxiliary wheel during pairing of the auxiliary wheel with the main wheel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
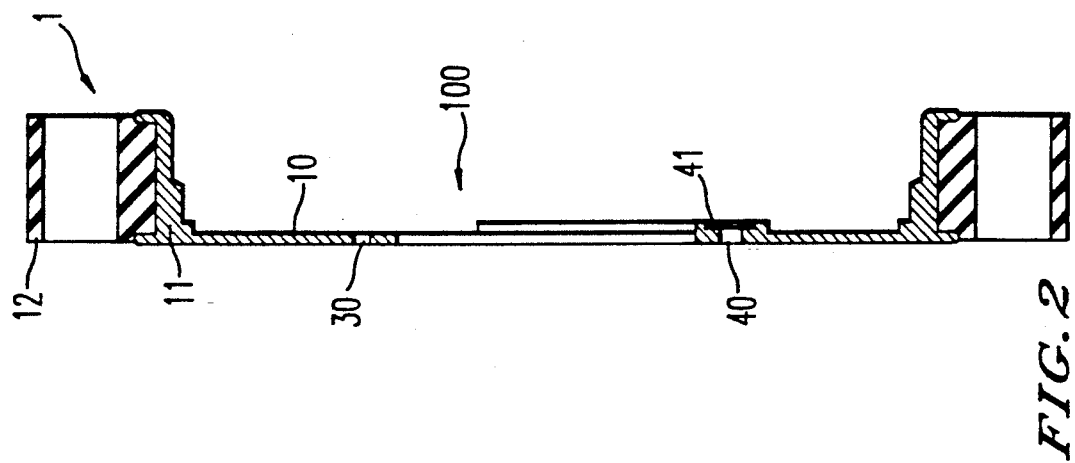
FIG. 2 is a section along II—II in FIG. 1.
Figure 1:
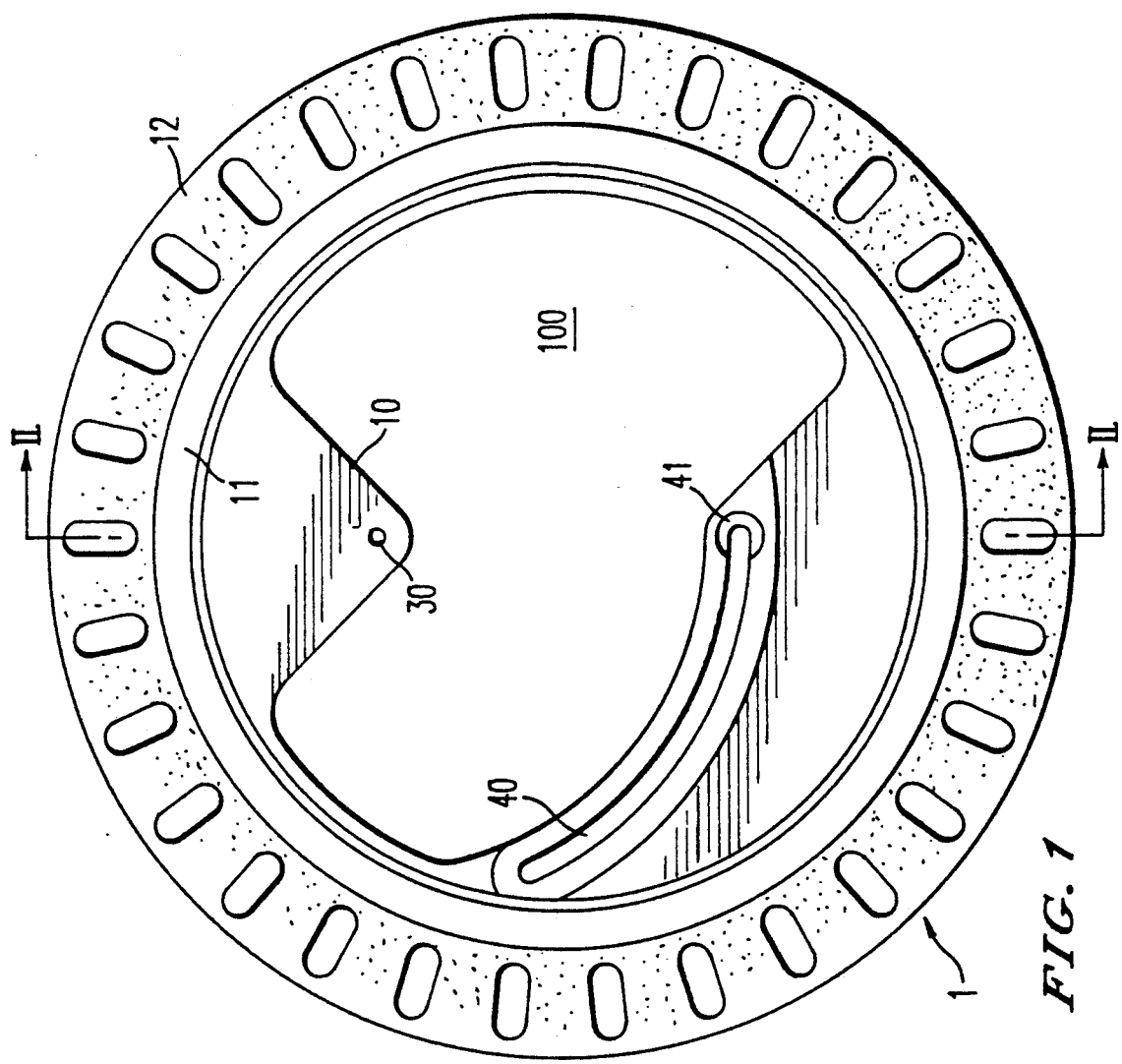
FIG. 1 is an elevation view of the auxiliary wheel.

FIGS. 1 and 2 illustrate the structure of auxiliary wheel 1. The latter comprises a flat disk 10 supporting the pairing means. Disk 10 is as hollow as possible in an effort to lighten it and also facilitate installation, wide recess 100 making it possible to clearly see the main wheel during the mounting. Auxiliary wheel 1 also comprises a wheel rim 11 supporting a tire, here consisting of a solid rubber tire 12, but which could also be a pneumatic tire. The outside diameter of auxiliary wheel 1 corresponds approximately to the diameter of main wheel 2 when pneumatic tire 24 is inflated to the nominal pressure.

The means for pairing auxiliary wheel 1 with the main wheel essentially comprises a pivot, and guide means placed in an arc of a circle center on the pivot. These guide means should constitute an arcuate slot which prevents the auxiliary wheel from separating from the main wheel, while making possible the rotation of auxiliary wheel 1 around the pivot defining an axis of rotation perpendicular to disk 10 of auxiliary wheel 1 and to disk 20 of main wheel 2 during the pairing.

Disk 10 therefore has a hole 30 cooperating with a bolt 31 to define the pivot, and a slot 40 placed in an arc of a circle centered on hole 30. The slot comprises guide means whose edges form guide surfaces extending along an arc centered on the hole 30. A circular housing or recess 41, whose role will be explained later, is also provided in the disk 10.

Figure 3:
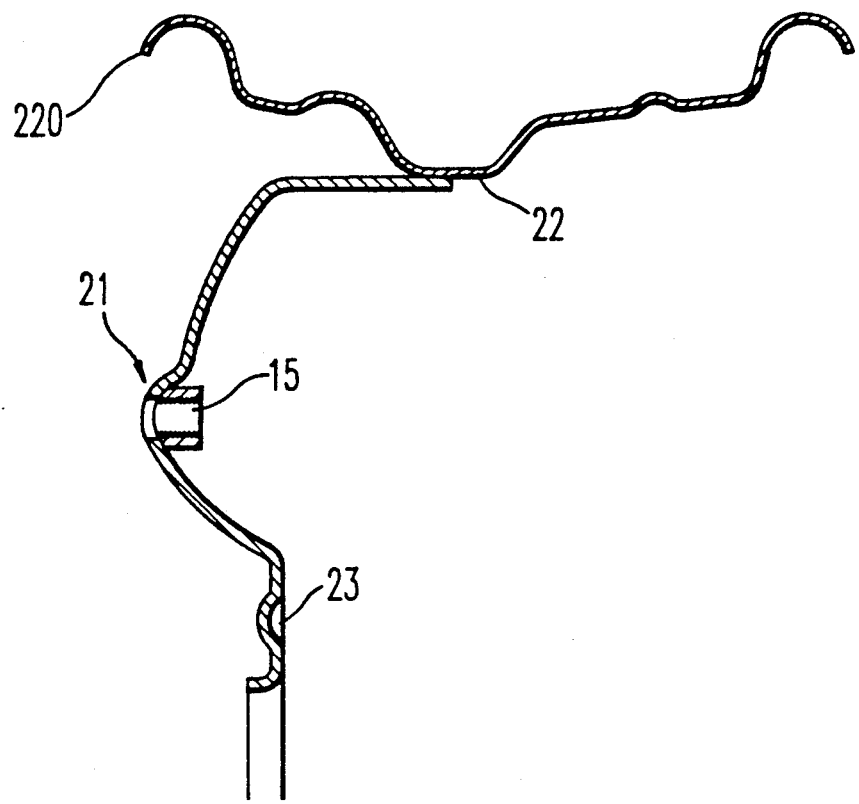
FIG. 3 shows the modification provided in the disk of the main wheel.
Figure 6:
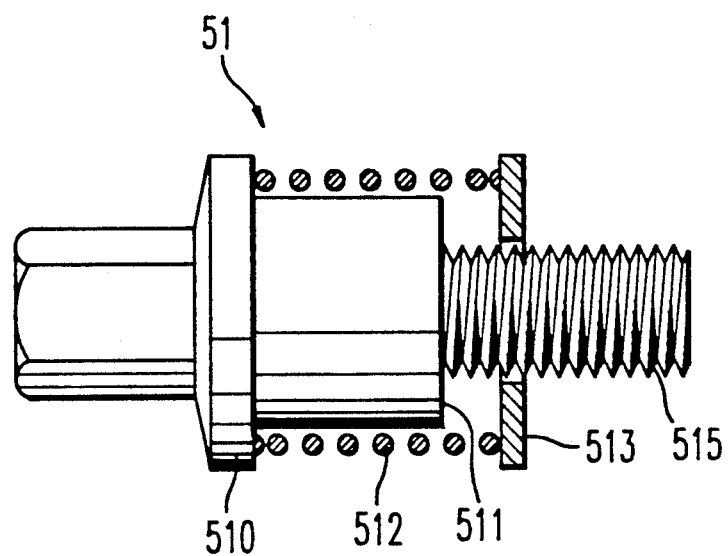
FIG. 6 shows a detail of the pairing means.

The pairing of auxiliary wheel 1 with main wheel 2 necessitates some adaptations of the latter, shown more particularly in FIG. 3. The pairing means according to the invention requires, on disk 20 of main wheel 2, only an extremely simple modification which is modest and not very costly. It comprises providing at least two, and preferably four, threaded holes 15 distributed on the periphery of disk 20 at equal distances from one another and at equal distances from the center of main wheel 2. Preferably, the threaded holes 15 are placed as far as possible from the center of main wheel 2. The axes of these holes are parallel to the axis of rotation of main wheel 2. For wheels made of sheet metal, the threaded holes may be placed at the vertex 21 of the boss between wheel rim 22 and zone 23 for holding main wheel 2 at the hub of the vehicle, as seen in FIG. 3.

The mounting of auxiliary wheel 1 will now be explained in relation to FIGS. 4 and 5, which illustrate some characteristics of the spare traveling device resulting from associating auxiliary wheel 1 and main wheel 2, by the pairing means described.

The addition of auxiliary wheel 1 to main wheel 2 modifies the offset of the point of contact of the vehicle with the ground. The offset is an important parameter which has a great influence on the behavior of the vehicle, i.e., on its handling. It therefore is important to make this offset supplement, due to the keeping in place of the main wheel, as small as possible. These considerations dictate the form of the meridian section of auxiliary wheel 1, as it appears in FIG. 5, in relation to the meridian section of main wheel 2.

Disk 10 of auxiliary wheel 1 is substantially flat and is connected to wheel rim 11 at the axially inside end of the latter. The ideal main wheel 2 is that where flange 220 of main wheel rim 22 is axially at the same level as boss 21 of disk 20, as shown in FIGS. 3 and 5. The disk 10 of auxiliary wheel 1 is in contact with disk 20 of main wheel 2, at the position of boss 21, which makes possible a good holding by locking the holding elements (pivot and guide means) when auxiliary wheel 1 is centered on main wheel 2.

If the boss 21 is offset axially toward the inside, then, as disk 10 of auxiliary wheel 1 should remain approximately flat to make possible a sufficient eccentricity and/or a connection to main wheel 2 at sufficiently separated points, it is necessary to provide reinforcements, in the form of washers for example, making possible the final locking without excessively deforming disk 10 of the auxiliary wheel.

If the boss 21 is offset axially toward the outside, then the mechanical connection poses no problem, but by maintaining the same auxiliary wheel 1, the offset is increased.

Figure 4:
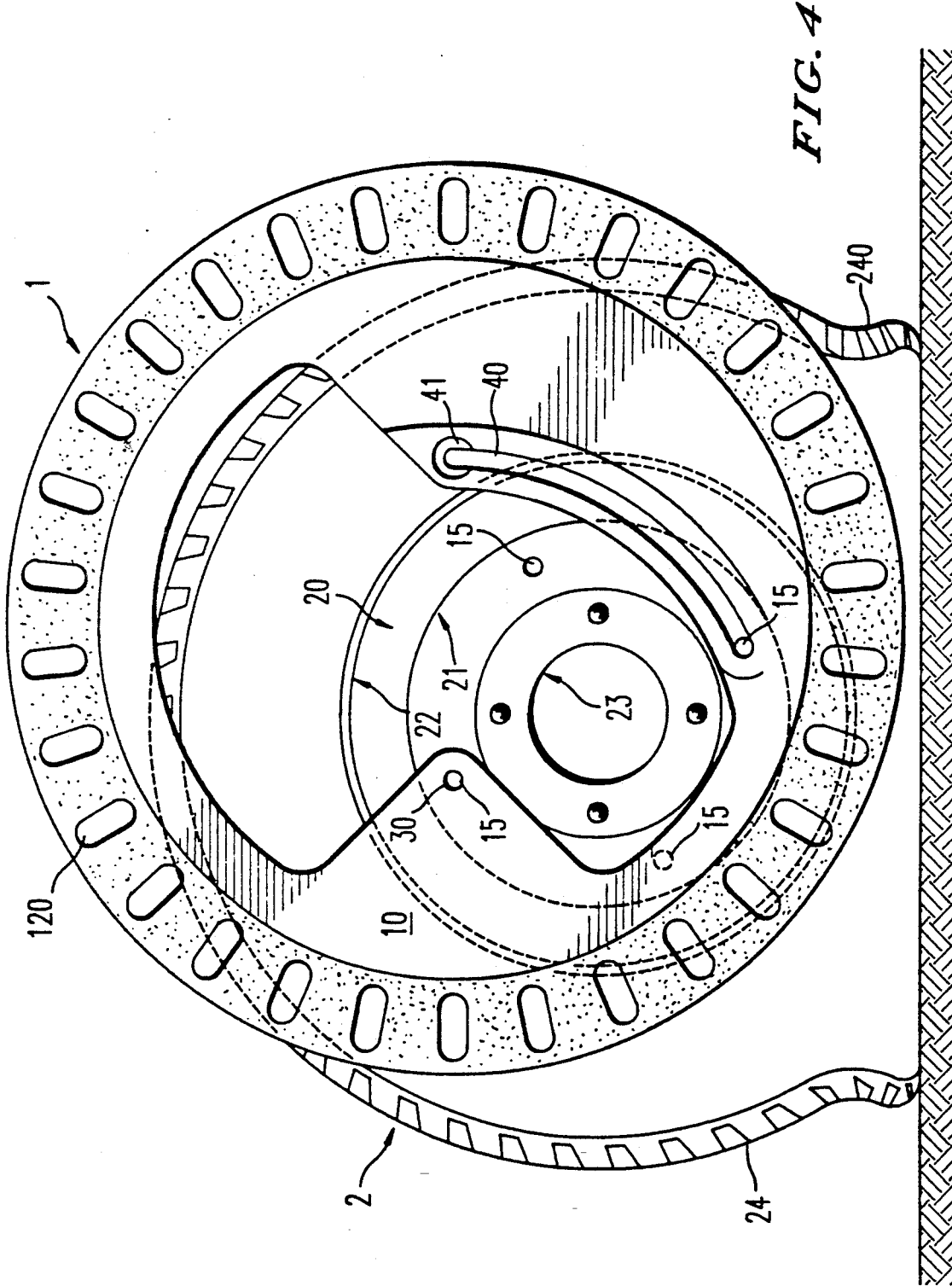
FIGS. 4 and 5 illustrate the mounting of the auxiliary wheel.
Figure 5:
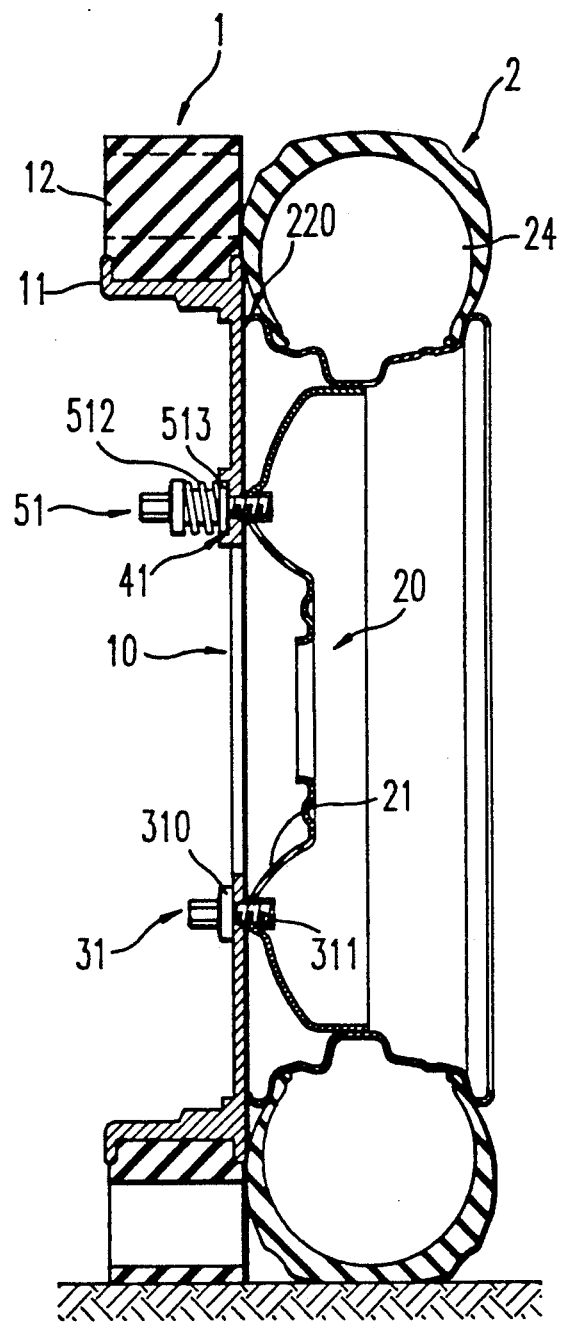

The mounting is made in the way illustrated more particularly in FIG. 4. On main wheel 2, the one of the threaded holes 15 is sought which is in the portion of disk 20 located in the left upper quarter, i.e., at a position between 9 and 12 o'clock. A bolt 31 is inserted through hole 30 in disk 10 of the auxiliary wheel to form the pivot means. The bolt 31 comprises a head 310 intended to hold disk 10 axially relative to disk 20 and a threaded portion 311. Threaded portion 311 is screwed into tapped hole 15 selected as explained above. Bolt 31 is then tightened sufficiently so that disks 10 and 20 are held parallel to one another. The pneumatic tire 24 is assumed to be deflated during the mounting of auxiliary wheel 1, as FIG. 4 shows. It is noted that the mounting would be carried out in the same way regardless of the state of inflation of pneumatic tire 24 because the wall of the latter projects from the wheel rim. It can be considered possible to also provide such pairing as an emergency repair device to improve the adherence on icy roads, for example.

During the tightening of bolt 31, auxiliary wheel 1 will necessarily be eccentric relative to main wheel 2, all the more so as it will most often be necessary to mount auxiliary wheel 1 so as to overlie walls 240 of a deflated pneumatic tire 24.

Then, threaded end 515 of a rod 51 is screwed into the one of the tapped holes 15 which are seen behind slot 40. This rod 51 cooperates with the slot to define the guide means and comprises a head 510, a stop 511, and a spring 512 which tends to hold a washer 513 away from stop 511. In a first step, rod 51 is screwed into the tapped hole 15 behind slot 40 until washer 513 rests firmly on disk 10 of auxiliary wheel 1, on both sides of slot 40. The guide means for auxiliary wheel 1 relative to main wheel 2 are thus provided.

A movement of the vehicle, either forward or backward, then causes the centering of auxiliary wheel 1 relative to main wheel 2 by a rotation of auxiliary wheel 1 around bolt 31 constituting a pivot, by the action of the weight of the vehicle as soon as tire 12 comes into contact with the ground. For example, a vehicle movement causing the main wheel to rotate in a clockwise direction (as seen in FIG. 4) will cause the bolt 31 to move upward and to the right. This causes the weight of the vehicle to be shifted to the auxiliary wheel 1 as the bolt 31 pivots on a pivot arm centered on the point of contact of the auxiliary wheel with the ground. Eventually, the bolt 31 reaches a "top dead center" position (i.e., vertically above the point of contact of the auxiliary wheel with the ground), after which the weight of the vehicle causes the rotation of the main wheel to accelerate such that the centers of the main and auxiliary wheels become concentric. During this time the rod 51 moves along the slot 40 until it enters the housing 41. FIG. 5 shows the position of the spare traveling device after such a rotation.

Preferably, locking means which prevent any return to an eccentric position of auxiliary wheel 1 relative to main wheel 2 are provided. The role of housing 41 is to receive washer 513 and comprise the locking means when the concentricity of wheels 1 and 2 is achieved. To finish the mounting, it is sufficient to finish the screwing of rod 51 into the hole 15 until stop 511 comes into contact with washer 513, thus immobilizing the auxiliary wheel relative to disk 20.

To reduce as much as possible the alterations of the behavior of the vehicle due to the increase of the offset, many recesses 120 have been provided in the tire 12, conferring therein a great flexibility in the peripheral direction. A number of substantially radial incisions also can be provided.

Figure 7:
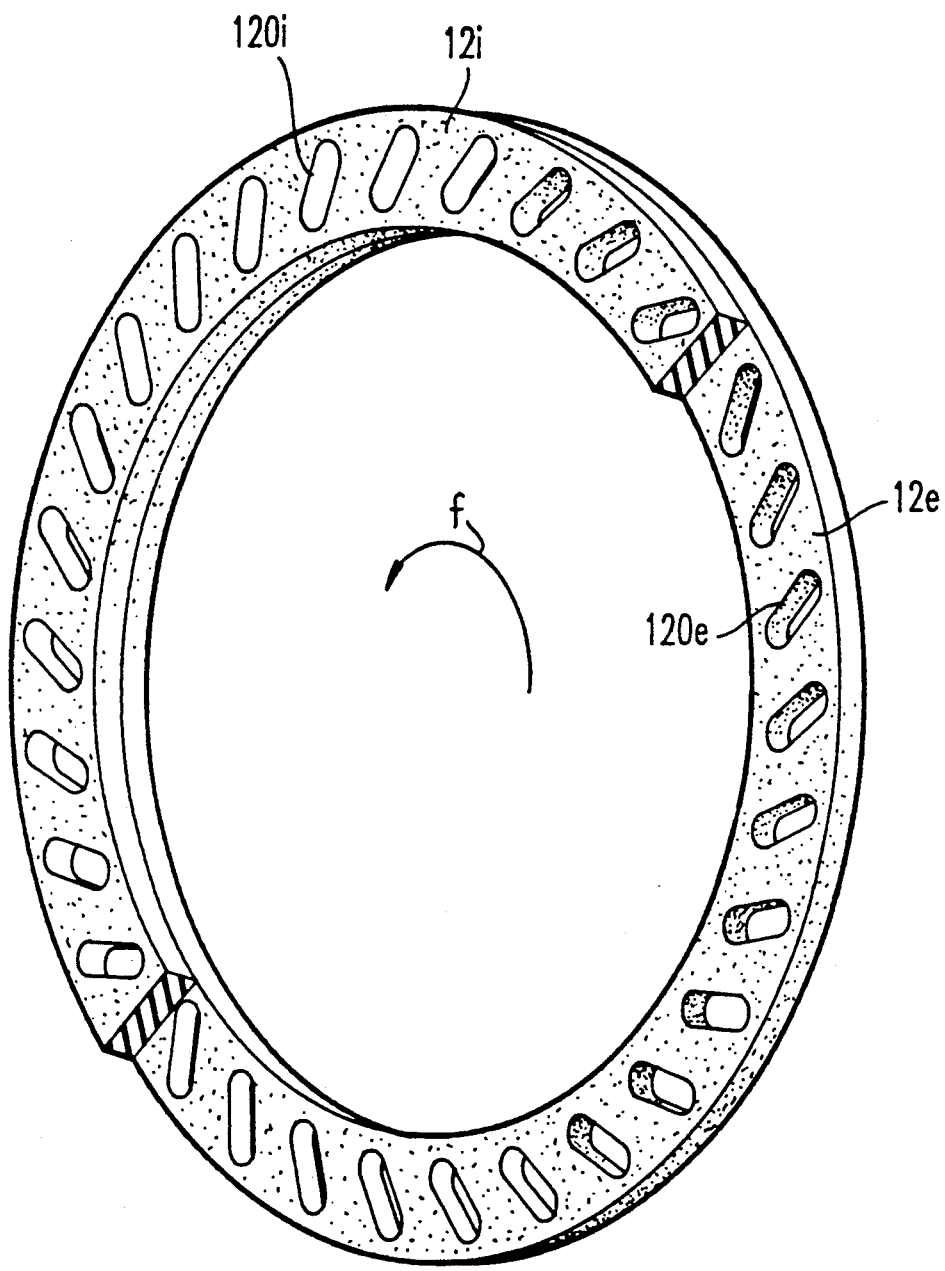
FIG. 7 shows a variant embodiment of the flexible ring encircling the auxiliary wheel.

FIG. 7 illustrates other measures that can be taken to correct any pull of the vehicle due to the increased offset. For example, tire 12 may be modified so that its tread is deformed into a section of a cone expanding in one direction or in the other (i.e., so that one axial side of the tread has a larger diameter), according to the engine or brake torque applied in use, to compensate for the undesired pull.

This result can be obtained by placing two elastic rubber tires 12i, 12e side by side on the wheel rim 11, a first one 12i of said tires to be placed beside main wheel 2 having incisions 120i inclined circumferentially backward relative to the direction of advance f, and the other tire 12e having incisions inclined circumferentially in the other direction 120e. FIG. 7 shows a 180° segment of the tire 12i being cut away to show the incisions in the tire 12e.

The invention therefore makes possible a spare traveling device by mounting the auxiliary wheel with a main wheel which remains in place on the vehicle. According to the invention, a guide slot separated from the pivot assures, contrary to what has been conventionally thought, an excellent mechanical connection of the auxiliary wheel to the main wheel, while making possible an extremely light design. Actually, the support points of the auxiliary wheel on the main wheel can be separated from one another and perform their guiding operation even during the mounting by relative rotation, i.e., while the wheels are still eccentric.

This device can be used instead of the conventional spare wheel or also can be used during such circumstances as, for example, those which require the use of chains to drive on a snowy road. In this case, such a device is mounted on each of the wheels of an axle and the tread of tire 12 is provided with a suitable pattern and/or provided with suitable elements, such as, for example, studs.

Obviously, numerous modifications and variations of the present invention are possible in light of the above teachings. It is therefore to be understood that with the scope of the appended claims, the invention may be practice otherwise than as specifically described herein.

What is claimed as new and desired to be secured by Letters Patent of the United States is:

1. An auxiliary wheel to be paired with a main wheel of a vehicle, comprising:
   a disk having a wheel rim;
   at least one circular tire mounted on said wheel rim;
   pivot means formed on said disk at a position eccentric to a center of said tire for pivoting said auxiliary wheel relative to said main wheel; and
   guide means formed on said disk and comprising at least one guide surface formed along an arc of a circle centered on said pivot means for guiding said pivoting of said auxiliary wheel during pairing of said auxiliary wheel with a main wheel.

2. The auxiliary wheel of claim 1 including means for locking a position of said auxiliary wheel relative to said main wheel when said auxiliary wheel has pivoted on said pivot mean to a position coaxial with said main wheel.

3. The auxiliary wheel of claim 2, wherein said guide means comprise:
   a slot in said disk; and
   a headed rod fittable in said slot for travel along said guide means when secured to said main wheel.

4. The auxiliary wheel of claim 3, wherein said locking means comprise:
   a washer fitted on said headed rod between the head thereof and said disk;
   a housing shaped to accommodate said washer and formed in said disk at a portion of said slot corresponding to a position of said washer when said main wheel and said auxiliary wheel are coaxial, whereby said washer can fit into said housing to immobilize said auxiliary wheel relative to said main wheel; and
   spring means for biasing said washer into said housing.

5. The auxiliary wheel of claim 4, wherein said pivot means comprise:
   a hole in said disk; and
   a threaded bolt fittable in said hole and securable to said main wheel.

6. The auxiliary wheel of claim 1, wherein said tire comprises a solid rubber tire having plural substantially radial incisions on a sidewall thereof.

7. The auxiliary wheel of claim 6, including two of said tires mounted side by side on said wheel rim, wherein said incisions are inclined in one circumferential direction relative to the radial direction on a first one of said tires, and inclined in the other circumferential direction on a second one of said tires.

8. The auxiliary wheel of claim 1 wherein said guide means comprise means for continuously guiding the pivoting of said auxiliary wheel between a position in which a vehicle is supported on the ground via a main wheel with said auxiliary wheel positioned eccentric to the main wheel and another position in which said auxiliary wheel and the main wheel are positioned concentric with one another.

9. A spare traveling assembly, comprising:
   a main wheel;
   an auxiliary wheel comprising a disk having a wheel rim;
   pivot means formed on said disk at a position eccentric to a center of said tire for pivoting said auxiliary wheel relative to said main wheel; and
   guide means formed on said disk and comprising at least one guide surface formed along an arc of a circle centered on said pivot means for guiding said pivoting of said auxiliary wheel during pairing of said auxiliary wheel with said main wheel.

10. The spare traveling assembly of claim 9 including means for locking a position of said auxiliary wheel relative to said main wheel when said auxiliary wheel has pivoted on said pivot means to a position coaxial with said main wheel.

11. The spare traveling assembly of claim 10, wherein said guide means comprise:
    a slot in said disk; and
    a headed rod fittable in said slot for travel along said guide means when secured to said main wheel.

12. The spare traveling assembly of claim 11, wherein said locking means comprise:
    a washer fitted on said headed rod between the head thereof and said disk;
    a housing shaped to accommodate said washer and formed in said disk at a portion of said slot corresponding to a position of said washer when said main wheel and said auxiliary wheel are coaxial, whereby said washer can fit into said housing to immobilize said auxiliary wheel relative to said main wheel; and
    spring means for biasing said washer into said housing.

13. The spare traveling assembly of claim 12, wherein said pivot means comprise:
    a hole in said disk; and
    a threaded bolt fittable in said hole and securable to said main wheel.

14. The spare traveling assembly of claim 13 including at least two threaded holes circumferentially distributed in the disk of said main wheel, wherein said bolt is threaded into one of said holes and said rod is threaded into another of said holes.

15. The spare travelling assembly of claim 14 wherein said at least two threaded holes comprise four threaded holes.

16. The spare traveling device of claim 9 wherein said guide means comprise means for continuously guiding the pivoting of said auxiliary wheel between a position in which a vehicle is supported on the ground via said main wheel with said auxiliary wheel positioned eccentric to said main wheel and another position in which said auxiliary wheel and said main wheel are positioned concentric with one another.

* * * * *